United States Patent
Walze et al.

(10) Patent No.: US 7,701,634 B2
(45) Date of Patent: Apr. 20, 2010

(54) LIGHT-GUIDING SURFACE STRUCTURE

(75) Inventors: Günther Walze, Krefeld (DE); Gunther Stollwerck, Krefeld (DE); Wilfried Haese, Odenthal (DE)

(73) Assignee: Bayer MaterialScience AG, Leverkusen (DE)

( * ) Notice: Subject to any disclaimer, the term of this patent is extended or adjusted under 35 U.S.C. 154(b) by 0 days.

(21) Appl. No.: 12/166,529

(22) Filed: Jul. 2, 2008

(65) Prior Publication Data

US 2009/0073567 A1    Mar. 19, 2009

(30) Foreign Application Priority Data

Jul. 18, 2007    (DE) .................. 10 2007 033 300

(51) Int. Cl.
*G02B 27/10* (2006.01)
*G02B 5/10* (2006.01)
(52) U.S. Cl. ........................ 359/619; 359/853
(58) Field of Classification Search .............. 359/619, 359/853
See application file for complete search history.

(56) References Cited

U.S. PATENT DOCUMENTS

| 2004/0066645 | A1 | 4/2004 | Graf et al. |
| 2006/0250819 | A1 | 11/2006 | Lee et al. |
| 2007/0047260 | A1 | 3/2007 | Lee et al. |
| 2007/0060704 | A1 | 3/2007 | Rudiger et al. |
| 2009/0046459 | A1 * | 2/2009 | Ijzerman et al. ............. 362/240 |

FOREIGN PATENT DOCUMENTS

| CN | 1924620 | 3/2007 |
| DE | 102005039413 | 2/2007 |
| EP | 0634445 A1 | 1/1995 |
| JP | 2006/284697 | 10/2006 |

* cited by examiner

Primary Examiner—William C Choi
(74) Attorney, Agent, or Firm—Connolly Bove Lodge & Hutz LLP

(57) ABSTRACT

The present invention relates to a multilayer, surface structured solid plate for light guidance, the base material of which consists of a transparent plastic material, and optionally one or more cover layers.

28 Claims, 5 Drawing Sheets

LIGHT-GUIDING SURFACE STRUCTURE

BACKGROUND OF THE INVENTION

1. Priority

Priority is claimed to German Patent Application No. 10 2007 033 300.7, filed Jul. 18, 2007. The aforementioned priority document is incorporated herein by reference in its entirety.

2. Field of the Invention

The field of the present invention relates to multilayer, surface structured solid plates for light guidance. Such light guides are generally formed from a transparent plastics material and optionally one or more cover layers.

3. Background

In the use of diffuser plates in the so-called backlight units (BLUs) of flat panel displays, an important factor is a very high and homogeneous brightness of the overall system, so that the brightness of the image on the flat screen is as high as possible. In principle a backlight unit (direct light system) has the structure described hereinafter. It consists generally of a housing in which, depending on the size of the backlight unit, a variable number of high-voltage tubular lamps, so-called CCFL (cold cathode fluorescent lamps) are generally arranged parallel to one another. The inside of the housing is equipped with a white diffusely light-reflecting surface. In individual cases other light sources can also be used (LEDs), which however does not further influence the basic structure. The diffuser plate, which has a thickness of 1 to 3 mm, preferably a thickness of 1.5 mm to 2.0 mm, lies on this lighting system. A set of films which can have the following functions is located on the diffuser plate: redistribution and focussing of the light in the forward direction, and homogenisation (diffuser films), redistribution and focussing of the light in the forward direction by prismatically structured films, for example by the so-called BEF (brightness enhancing films), in addition to a prism film, often a further diffuser film, for avoiding Moire effects or a reflecting polarizer, for example DBEF (dual brightness enhancement films) and linear polarisers. The linearly polarising film lies directly underneath the LCD display arranged on top.

Light-scattering translucent products of polycarbonate with various light-scattering additives, and moulded parts produced therefrom, are already known from the prior art.

Thus, for example, EP-A 634 445 discloses light-scattering compositions which contain polymeric particles based on vinyl-acrylate with a core/shell morphology in combination with $TiO_2$.

The use of light-scattering polycarbonate films in flat screens is described in US 2004/0066645. Here, polyacrylates, PMMA, polytetrafluoroethylenes, polyalkyl trialkoxysiloxanes and mixtures of these components are mentioned as light-scattering pigments.

In DE 10 2005 039 413 PC diffuser plates containing 0.01% to 20% of scattering pigment are described.

However, all these diffuser plates have a transmission of 50%-70%, whereas polycarbonate not containing additives has a light transmission of 90%. The transmission has a decisive influence on the achievable brightness.

In order to evaluate the suitability of the light-scattering plates for so-called backlight units for LCD flat screens, in particular the brightness of the overall system must be taken into account, in other words the whole BLU including the set of films, and not only the diffuser plates per se. The diffuser plates should have as high a homogeneity as possible of the light distribution at maximum brightness. Both properties are desired, but in the case of conventional diffuser plates they are as a rule conflicting properties.

A homogenisation by means of surface structures as described in JP 2006/284697 or US 2006/10262666 has the advantage of a high transmission and thus a high brightness. In this connection simple barrel-shaped or prism-shaped ridges or a combination thereof form the basic type of structure, which in certain cases contain slight variations such as indentations; mathematically these structures can often be described in terms of elliptical sections and in this case are as a rule termed lenticular structures. However, the achievable homogeneity is limited and is less than the achievable homogeneity of conventional diffuser plates. The structure enlarges the direct image of the lamps. Without going into the theory, the light density maxima are enlarged via the lamps, though their position remains unaltered. A minimum exists between the lamps. For large lamp interspacings and where there are only a few lamps, this leads to an inhomogeneous image. In order to achieve a sufficient homogeneity for demanding BLU structures (larger lamp interspacings, small overall height), complicated and costly multilayer structures are often proposed.

Light-guiding structures in plastics material containing scattering additive consisting of truncated prisms are described in CN 1924620. These structures are said to form three clear images of the lamps and are enlarged by means of the scattering additive that is additionally also used within the structure, in order thereby to permit a homogeneous backlighting. In this arrangement the employed scattering additive interferes however in the light-guiding action of the structure, so that ultimately no homogeneous backlighting can be achieved.

In US2007047260 and US2006250819 compound parabolic concentrators on scattering plates for backlight units are described. These however are not linearly arranged, but are circular, tetragonal or polygonal. Also, the CPCs in this case serve only to increase the brightness and not to homogenise the light of a plurality of CCFLS.

SUMMARY OF THE INVENTION

The present invention is directed toward to a planar moulded article comprising a front side and a rear side, characterised in that the front side comprises light-guiding structures consisting of a lens region and a convex CPC (compound parabolic concentrator) region.

In a further separate aspect of the present invention, the planar moulded article is characterised in that the light-guiding structures are substantially translation invariant.

In another further separate aspect of the present invention, the planar moulded article is characterised in that the lens regions and CPC regions each are identical, dependent or independent.

In another further separate aspect of the present invention, the planar moulded article is characterised in that the individual lens regions and CPC regions can be described by independent sets of parameters.

In another further separate aspect of the present invention, the planar moulded article is characterised in that the CPC region can be determined by:

a) calculation of the aperture angles in the medium $\theta_1$ and $\theta_2$ from Fresnel's equations by means of the defined acceptance angles;

b) construction of the parabola branch $P_1$ with the aperture angle in the medium $\theta_1$ and construction of the parabola branch $P_2$ with the aperture angle in the medium $\theta_2$ according to the equation:

$$y_{1,2} = \frac{(x \mp \cos\theta_{1,2})^2}{2(1 \mp \sin\theta_{1,2})} - \frac{1 \pm \sin\theta_{1,2}}{2}$$

wherein $\theta_{1,2}$ is the aperture angle in the medium of the left ($\theta_1$) and right ($\theta_2$) parabola, x is the X coordinate, and $y_{1,2}$ is the Y coordinate of the left ($y_1$) and right ($y_2$) parabola;

c) Calculation of the end points of the parabola branches $F_1$, $F_2$ and $E_1$, $E_2$;

d) Rotation of the parabola branch $P_1$ about the aperture angle in the medium $-\theta_1$ and of the parabola branch $P_2$ about the aperture angle in the medium $\theta_2$ and translation of the parabola branch $P_2$ along the X axis;

e) Optionally in the case of an asymmetric variant where $\theta_1 \neq \theta_2$, determination of the inclination of the inclined surface defined by the points $E_1$ and $E_2$;

f) Determination of the effective acceptance angles in air from the geometry constructed in steps a) to e);

g) Comparison of the effective acceptance angles with the defined acceptance angles, and if the deviation is greater than 0.001%, repetition of steps a) to f) with corrected acceptance angles instead of the defined acceptance angles in step a), wherein the corrected acceptance angles are not equal to the defined acceptance angles, and wherein the corrected acceptance angles are chosen so that the effective acceptance angles from step f) agree with the defined acceptance angles; and h) On achieving a deviation of the effective acceptance angles from the defined acceptance angles of 0.001% or less, shortening the parabolas in the y direction to the extent defined by the shortening factor.

In another further aspect of the present invention, the planar moulded article is characterised in that the defined acceptance angle $\theta_1$ is between 5° and 60° and the defined acceptance angle $\theta_2$ is between 5° and 60°.

In another further separate aspect of the present invention, the planar moulded article is characterised in that in step h) the shortening is simple truncation.

In another further separate aspect of the present invention, the planar moulded article is characterised in that in step h) the shortening is a compression of the geometry along the y axis by a factor determined by the shortening factor.

In another further separate aspect of the present invention, the planar moulded article is characterised in that $\theta_1 = \theta_2$.

In another further separate aspect of the present invention, the planar moulded article is characterised in that the lens is an ellipse.

In another further separate aspect of the present invention, the planar moulded article is characterised in that the overall period is in a range between 10 µm and 1 mm, preferably 30 µm to 500 µm, particularly preferably 50 µm to 300 µm.

In another further separate aspect of the present invention, the planar moulded article is characterised in that the CPC region comprises a continuously polynomial closure, which is for example an nth order polynomial, in particular a fourth order polynomial, which is continuously differentiable at the points $F_1$ and $F_2$.

In another further separate aspect of the present invention, the planar moulded article is characterised in that the CPC region comprises a continuous polynomial closure. This means that the structure between the points $F_1$ and $F_2$ of the CPC region can be described by a polynomial function. In one aspect this polynomial function is a polynomial of the nth order with n being equal to or lower than 32. The polynomial function may also be a polynomial of the 4th order being continuously differentiable at the points $F_1$ and $F_2$.

In another further separate aspect of the present invention, the structure between $F_1$ and $F_2$ can be described by a parabola, hyperbola, circular function, sinusoidal function or straight line.

In another further separate aspect of the present invention, the planar moulded article is characterised in that if the profile of the lens region is a lens, the polynomial is a nth order polynomial, and if the profile of the lens region is a circle, the polynomial is an ellipse, and if the profile of the lens region is a compressed circle, the polynomial is an nth order polynomial.

In another further separate aspect of the present invention, the planar moulded article is characterised in that the regions differ less than 5%, or at least less than 10% from one of the above described geometries.

In another further separate aspect of the present invention, the planar moulded article is characterised in that the structures cover at least 80, 90, 95 or 100% of the surface of the front side.

In another further separate aspect of the present invention, the planar moulded article is characterised in that the moulded article comprises on the rear side a surface structure having a scattering effect.

In another further separate aspect of the present invention, the planar moulded article is characterised in that the moulded article contains on the rear side a UV-absorbing layer.

In another further separate aspect of the present invention, the planar moulded article is characterised in that the moulded article comprises in the translation invariant direction overmodulated structures that achieve an additional scattering effect.

In another further separate aspect of the present invention, the planar moulded article is characterised in that the moulded article comprises a transparent thermoplastic material, for example polycarbonate, polystyrene or modified polystyrene, PMMA or PET, or blends thereof, and in particular polycarbonate. The moulded article preferably has a transmission>85%, in particular 90%.

In another further separate aspect of the present invention, the planar moulded article may be produced by extrusion Another further separate aspect of the invention is the use of such a planar moulded article as diffuser plate or as diffuser film which is used on a diffuser plate, a diffuser plate comprising such a planar moulded article, and a backlight unit comprising such a planar moulded article or such a diffuser plate.

In yet another further separate aspect of the present invention, any of the foregoing aspects may be employed in combination.

Accordingly, an improved light guiding surface structure is disclosed. Advantages of the improvements will appear from the drawings and the description of the preferred embodiment.

BRIEF DESCRIPTION OF THE DRAWINGS

In the drawings, wherein like reference numerals refer to similar components.

Figure 1:
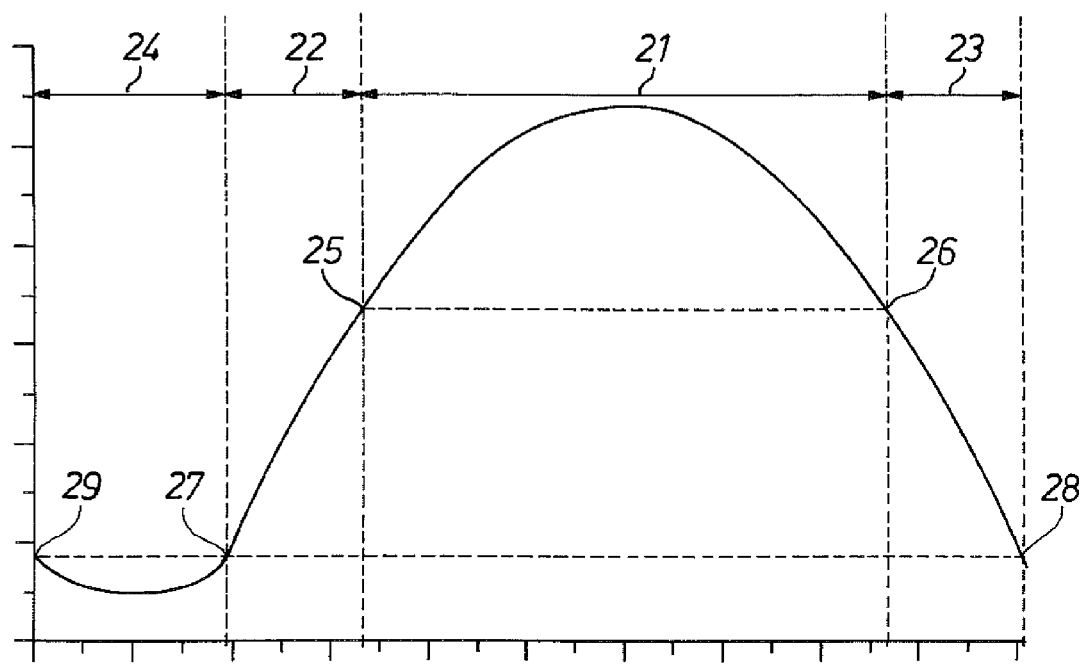
FIG. 1 is a cross-sectional view of a light-guiding structure.
Figure 2:
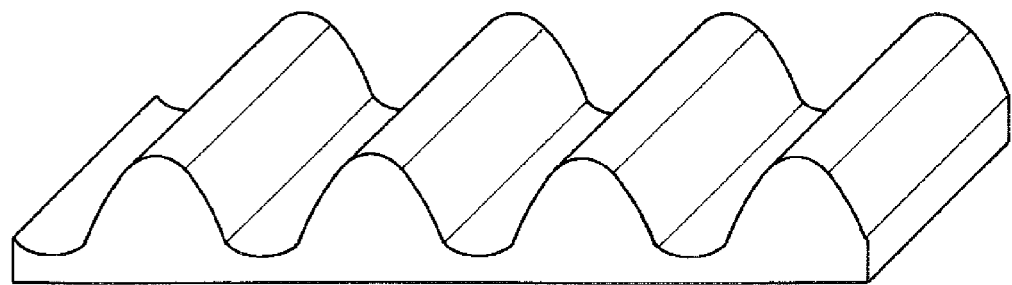
FIG. 2 is a 3-D illustration of a light guiding structure.

1 Light-guiding scattering plate
2 Diffuser film
3 Prism film BEF
4 Reflection polariser film DBEF
5 CCFL
6 Reflecting rear side
7 Interspacing of the CCFLs
8 Distance between the CCFL and light-guiding scattering plate
11 CPC structures on the light-guiding scattering plate
21 Polynomial region of the light-guiding structure
22 Left CPC region (parabola P1) of the light-guiding structure
23 Right CPC region (parabola P2) of the light-guiding structure
24 Lens region of the light-guiding structure
25 Upper end point F1 of the CPC
26 Upper end point F2 of the CPC
27 Lower end point E3 of the CPC
28 Lower end point E4 of the CPC
29 Left end point L1 of the lens region
31 Aperture angle θ1 of the parabola P1
32 Aperture angle θ2 of the parabola P2
33 CPC body
34 X co-ordinate
35 Y co-ordinate
36 Shortening of the CPC body determined by the truncation factor
37 Brightness (perpendicular view on the BLU)
38 Position on the backlight unit (orthogonal to the lamps)
39 Brightness distribution of the lamps without any measure referred to Example 1
40 Brightness distribution in a structure as in comparison Example 1
41 Brightness distribution in a structure as in Example 1
42 Brightness distribution in a structure as in comparison Example 2
43 Brightness distribution of the lamps without any measure referred to Example 2
44 Brightness distribution in a structure as in Example 2
45 Lower end point E1 of the unshortened CPC
46 Lower end point E2 of the unshortened CPC
47 Brightness distribution of the lamps without any measure referred to Example 3
48 Brightness distribution in a structure as in Example 3
49 Brightness distribution of the lamps without any measure referred to Example 4
50 Brightness distribution in a structure as in Example 4

DETAILED DESCRIPTION OF THE PREFERRED EMBODIMENTS

As used herein, the terms "front side" and "rear side" denote the two large surfaces on opposite sides of the planar moulded article. In the envisioned use, the rear side is turned towards the lightning source, the front side is turned away from the lightning source.

As used herein, the term "convex CPC" region means that the broader side of the CPC is directed towards the rear side.

As used herein, the expression "translation invariant" means that the structure shows no or at least no significant or additional variation over the surface in one direction, whereas in a direction perpendicular thereto it is in the form of longitudinal peaks and troughs, i.e. forms a ridge-type structure.

As used herein, the expression "overmodulated" means that the structure along the translational invariant direction, i.e. along the ridge structure, has an additional variation which is independent of the variation transverse to the ridge structure. In mathematical terms the effective surface structure forms an addition to the ridge structure, with a structure independent thereof and which is furthermore termed overmodulated. This overmodulated structure may be a sinusoidal function, a random scattering function or any other function.

As used herein, the expression "lens region" means a part of the light-guiding structure that can be described mathematically by a lens-type function.

As used herein, the expression "CPC region" means a part of the light-guiding structure that can be described mathematically by a CPC function.

As used herein, the expression "identical" means that all lens regions have an identical shape and all CPC regions have an identical shape, i.e. can be described by the same parameters.

As used herein, the expression "dependent" means that adjacent lens regions or CPC regions have a shape which, although it can be different, is nevertheless predetermined by the respective adjacent region, in other words is dependent on the latter. This expression describes structures that have overall different shapes but which nevertheless can vary periodically.

As used herein, the expression "independent" means that adjacent lens regions or CPC regions have a shape whose descriptive parameters are completely independent of one another. Each of the individual structures can in this case have a different shape.

The light-guiding structures described hereinafter are also called ACPC (advanced compound parabolic concentrator).

Figure 3:
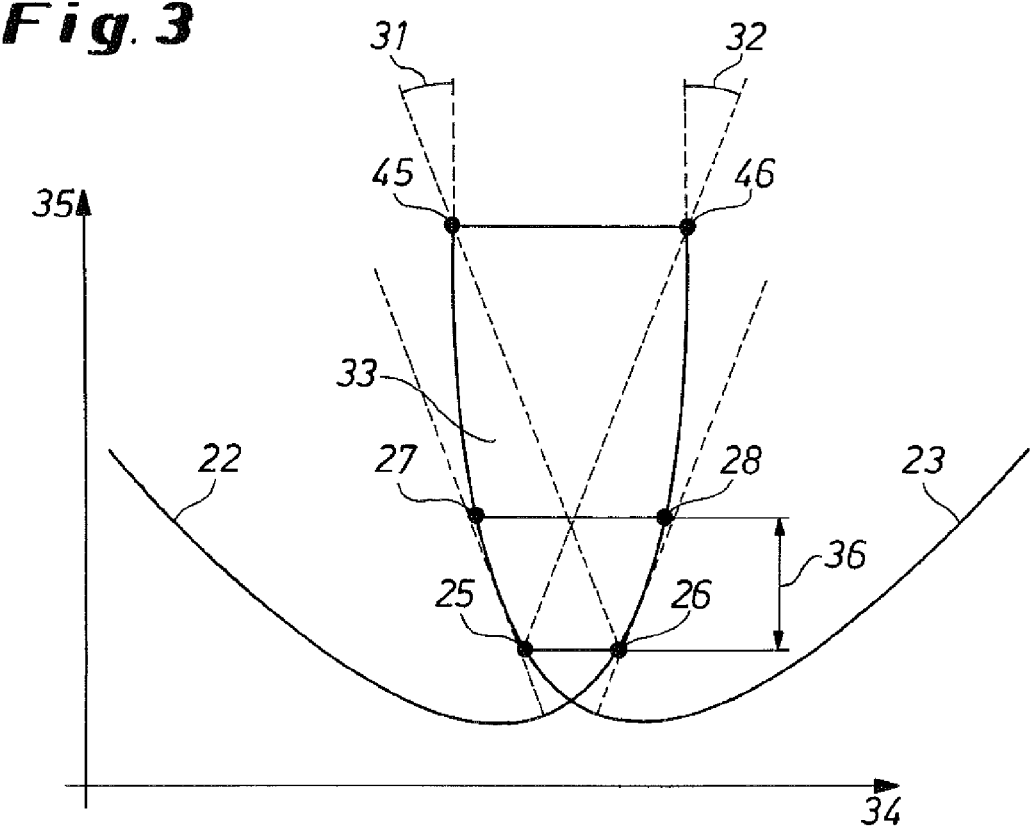
FIG. 3 is a graph showing the principle of construction underlying a compound parabolic concentrator.
Figure 4:
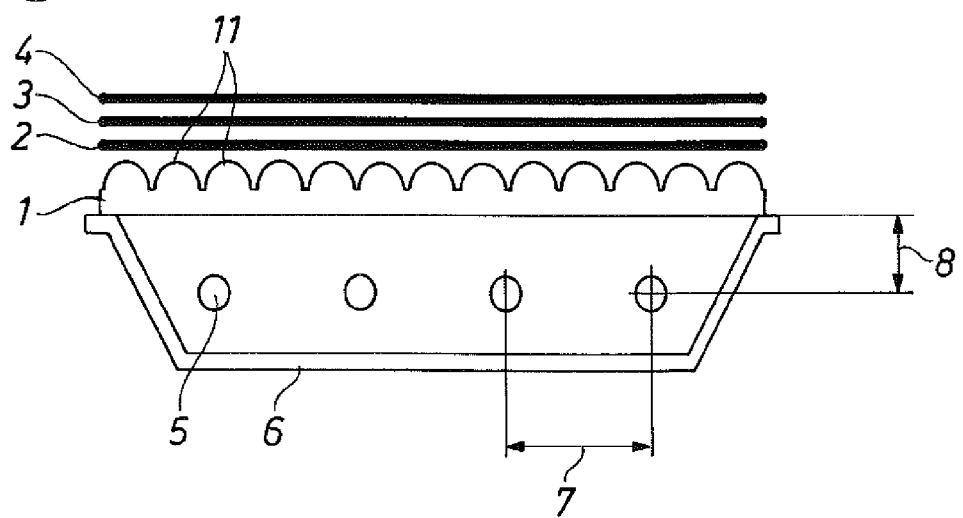
FIG. 4 is a cross-sectional view of a backlight unit.

The CPC region follows the design of a conventional dielectric CPC (compound parabolic concentrator), the difference being however that it comprises a continuous polynomial closure (polynomial). Dielectric CPCs are conventionally used as concentrator systems, and are based—in contrast to metallic CPCs, which have been known for even longer—on the optical principle of total internal reflection. For the mathematical determination of the CPC in the form used here, the determining parameters are the two—here generally identical—acceptance angles as well as the shortening factor. CPCs (FIG. 3) are constructed according to the following procedure using the aforementioned formulae. The described procedure is an implicit optimisation problem:

1. Calculation of the aperture angle in the medium $\theta_1$ and $\theta_2$ (31 and 32) from Fresnel's equations by means of the defined acceptance angles.

2. Construction of the parabola branch $P_1$ with the aperture angle in the medium $\theta_1$ and construction of the parabola branch $P_2$ with the aperture angle in the medium $\theta_2$ according to the equation $$y_{1,2} = \frac{(x \mp \cos\theta_{1,2})^2}{2(1 \mp \sin\theta_{1,2})} - \frac{1 \pm \sin\theta_{1,2}}{2}$$

wherein $\theta_{1,2}$ is the aperture angle in the medium of the left ($\theta_1$) and right ($\theta_2$) parabola, x is the X co-ordinate, and $y_{1,2}$ is the Y co-ordinate of the left ($y_1$) and right ($y_2$) parabola;

3. Analytical calculation of the end points of the parabola branches $F_1$, $F_2$, $E_1$, and $E_2$ (25, 26, 45, 46).

4. Rotation of the parabola branch $P_1$ about the aperture angle in the medium $\theta_1$ and of the parabola branch $P_2$ about the aperture angle in the medium $\theta_2$ and translation of the parabola branch $P_2$ along the X axis;

5. In the case of the asymmetric variant where $\theta_1 \neq \theta_2$ (31 and 32) the inclination of the inclined surface defined by the points $E_1$ and $E_2$ is now determined.

6. The effective acceptance angles in air are determined from the construction.

7. Comparison with the desired acceptance angles. If there is too small an agreement, repetition of the procedure starting at Point 1 with matched acceptance angles.

8. If the accuracy is sufficient, shortening—simple truncation—of the parabolas in the y direction to the extent determined by the shortening factor (36) with the new end points $E_1$ and $E_2$ (27 and 28).

9. Replacement of the edge bounded by the points $F_1$ and $F_2$ (25, 26) by an nth order polynomial that is joined in a continuously differentiable manner.

In the present case the CPCs are used in a different way to their original function. If a CPC is adapted so that its acceptance angle $\theta_1$ and $\theta_2$ (FIG. 3) lies just below the angle of incidence of the light on the diffuser plate in the region between two lamps, then an increase in light density is obtained at this freely definable point. The CPC defined in this way determines the region between the points 25 and 27 as well as the region between the points 26 and 28 in FIG. 1. The CPCs can either be provided symmetrically with the same aperture angles $\theta_1=\theta_2$, or asymmetrically with different aperture angles $\theta_1 \neq \theta_2$.

The polynomial region between the points 26 and 26 in FIG. 1 is a continuously adapted function. This can be an nth order polynomial, a circular section, an ellipse, a sinusoidal function, a parabola, a lens or a straight line. An nth order polynomial is preferred. A fourth order polynomial that is continuously differentiable at the points 25 and 26 is particularly preferred.

The polynomial between the points 25 and 26, in combination with the lens region (lens) between the points 29 and 27, determines the height and width of a maximum in the region directly above the lamps. The brightness is here very high in the case of a flat surface in a small spatial region, but falls off sharply. The scattering effect of the lens in this region leads to a broadening and simultaneous lowering of this maximum. This broadening can be controlled via the curvature of the region. The determining parameter is in this case the standardised focal length of the scattering lens. The lens can be calculated according to the following formulae: sinusoidal, nth order polynomial, parabola, hyperbola, ellipse, circle, circular arc, straight line. An ellipse is preferred.

The last construction parameter is the ratio of the two partial regions 24 as well as the sum of 21, 22 and 23. The maxima between the lamps and directly above the lamps can be brought to an identical brightness level via this ratio. Depending on which function is used in the polynomial region, a corresponding function must be employed in the lens region. Preferred combinations are shown in the following table:

| Lens | Polynomial |
|---|---|
| nth order polynomial | nth order polynomial |
| nth order polynomial | sinusoidal |
| compressed circle | nth order polynomial |

By tripling the maxima in comparison to a doubling in the conventional lenticular structure, the homogenisation effect is unequally larger in the same system. In addition the position of the maxima as well as their width and maximum intensity can be matched separately from one another. Accordingly the structure is also suitable for critical backlight unit assemblies (for example fewer lamps, thinner assemblies).

The structure can be described precisely mathematically by means of a few parameters and can be matched to the respective design of the backlight unit. In this way a very homogeneous backlighting with at the same time a high brightness level is possible. In addition, in contrast to the conventional systems based on volume scattering, the effect is independent of the thickness of the plate, which provides an additional degree of freedom in the construction.

The structure of the CPCs, of the polynomial as well as of the lens region can also be approximated by other mathematical functions, with a trade-off as regards the homogeneity of the brightness. This can be an approximation by individual straight line sections, or by an nth order polynomial or other functions known to the person skilled in the art.

In backlight units with a reduced number of CCFLs (depending on the application 4, 12, 14, 16 instead of 20 or 22 CCFLs in a 42-inch LCD television), the light-guiding structure enables the light to be homogeneously distributed with a diffuser plate so that differences in brightness are minimised and can no longer be detected by the eye when the television is in use. The detection limit for differences in brightness in TVs is described in the norm Semi D31-1102 (lamp mura).

In certain cases an additional surface structure with a scattering action on the front side and/or rear side increases this effect further.

The effect of the homogenisation of the light distribution can be increased further by additionally incorporated scattering particles. Normally the action of a light-guiding structure such as the ACPC structure is enhanced by the scattering effect of small scattering particles, so that only the scattering of the scattering particles remains as the single effect. In addition it was surprisingly found that at a low concentration of the scattering particles the homogenisation of the light is significantly improved.

The scattering particles can be polymeric or inorganic particles. A large number of different substances are suitable as scattering particles, for example inorganic or organic materials. These may furthermore be present in liquid, solid or also gaseous form.

Examples of inorganic substances include salt-like compounds such as titanium dioxide, zinc oxide, zinc sulphide, barium sulfate, etc., but also amorphous materials such as inorganic glasses.

Examples of organic substances include polyacrylates, polymethacrylates, polytetrafluoroethylene and polytrialkoxysiloxanes. The scattering particles can be acrylate-based polymeric particles with a core/shell morphology. In this case they are for example and preferably those disclosed in EP-A 634 445.

Examples of gaseous materials are inert gases such as nitrogen, noble gases, but also air or carbon dioxide. The materials are "dissolved" under pressure in the polymer melt and processed into moulded articles, for example by extrusion methods. They then form gas bubbles on cooling/pressure relaxation of the moulded article.

These scattering particles can furthermore have widely differing geometries, ranging from a spherical shape up to geometrical shapes that form crystals. Transitional shapes are also possible. It is furthermore possible for these scattering particles to have different refractive indices over their cross-section, for example resulting from coatings of the scattering particles or resulting from core/shell morphologies.

The scattering particles are useful for imparting light-scattering properties to the polycarbonate. The refractive index n of the scattering particles preferably lies within ±0.25 unit, more preferably within ±0.18 unit and most preferably within ±0.12 unit of the refractive index of the polycarbonate. The refractive index n of the scattering particles preferably lies not closer than ±0.003 unit, more preferably not closer than ±0.01 unit and most preferably not closer than ±0.05 unit to the refractive index of the polycarbonate. The refractive index is measured according to the standard ASTM D 542-50 and/or DIN 53400.

The scattering particles generally have an average particle diameter of at least 0.5 micrometre, preferably of at least 2 micrometres, more preferably from 2 to 50 micrometres, and most preferably from 2 to 15 micrometres. "Average particle diameter" is understood to denote the numerical average. Preferably at least 90% and most preferably at least 95% of the scattering particles have a diameter of more than 2 micrometres. The scattering particles are preferably a free-flowing powder.

In one preparation method the scattering particles are incorporated into the base material of the diffuser plate, wherein the light-scattering structure is formed on the front side as a thin layer of a transparent plastics material without any scattering particles. In another preparation method the scattering particles are applied in a thin layer to the rear side of the diffuser plate. These thin layers are preferably produced by co-extrusion. These thin layers can also be produced by coating.

The scattering particles in the base material are employed in a concentration of 0.001% to 0.1%, preferably in a concentration of 0.01% to 0.2%. The scattering particles in the thin layer on the rear side are employed in a concentration of 0.1% to 10%, preferably of 0.5% to 5%.

The diffuser plates with the light-guiding ACPC structures are produced by extrusion, injection moulding, injection-compression moulding, hot embossing, cold embossing or high pressure forming, preferably by extrusion. In the case of extrusion the structure is carved in one of the rollers. The structure can be applied to the roller by high-precision milling, laser treatment, chemical structuring, photolithography or other technologies known to the person skilled in the art.

The diffuser plates can also comprise further layers, i.e. a middle layer and optionally a further layer on the front side and/or the rear side.

The middle layer basically serves to impart stiffness and thermal stability to the plate. In the case where no layer is employed on the front side, the structure is embossed into the middle layer. The layer on the front side basically serves for the embossing of the structure. The layer on the rear side serves to protect the middle layer, for example against yellowing due to UV light. The layer can furthermore also have an additional scattering function, which in turn is achieved by a surface structuring or by adding scattering pigments.

The thickness of the diffuser plates is between 0.2 mm and 5 mm, preferably from 1 mm to 3 mm, particularly preferably from 1 mm to 1.5 mm. The surface area is preferably between 10 cm$^2$ and 2 m$^2$.

The thickness of a diffuser film is between 50 and 500 μm.

Apart from the use in a backlight unit the diffuser plates with ACPC structure can also be used for the homogenisation of the brightness of large-area lighting installations. In addition, such diffuser plates and diffuser films may also be used in applications such as lighting articles as LED's, fluorescent lamps or OLED's. The skilled artisan will recognize that many other applications and uses are possible.

Example 1

Figure 5:
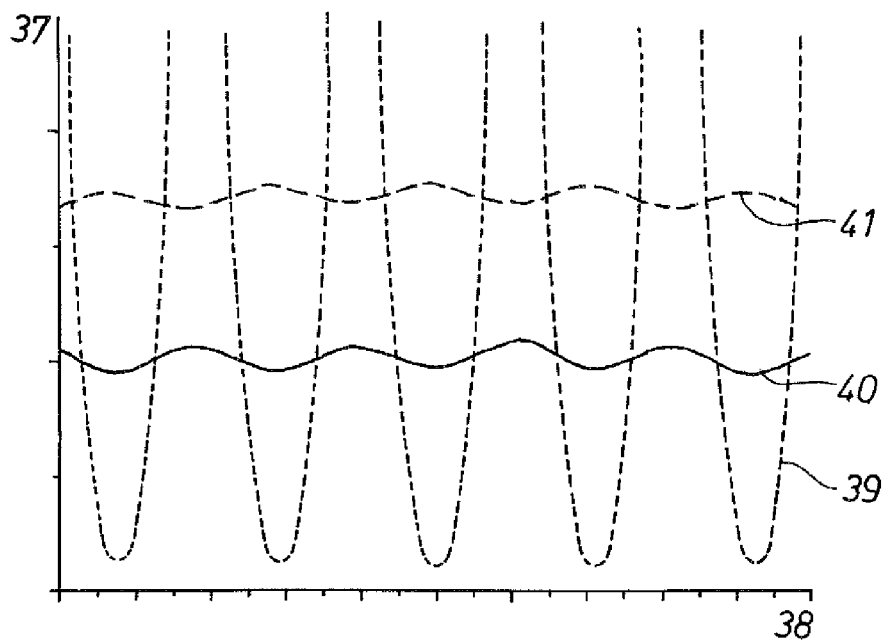
FIG. 5 shows the brightness distribution according to Example 1.

A 32" backlight unit with a lamp mid-point interspacing of 19.8 mm, a lamp diameter of 3 mm and a diffuser plate/lamp interspacing of 6.1 mm is used. A diffuser plate of Makrolon® OD 2015 (optical quality polycarbonate with a MVR of 16.5 cm$^3$/10 min according to ISO 1133 at 250° C. and 2.16 kg, a glass transition temperature of 145° C. according to ISO 11357-1, -2 and 10° C./min, VICAT softening point of 145° C. according to ISO 306 at 50N and 50° or 120° C./hour, a refractive index of 1.584 according to ISO 489 and Method A, as well as a light transmission of >89% according to ISO 13468-2 at 550 nm and 1 mm and >90% at 800 nm and 1 mm, Bayer MaterialScience, Leverkusen, Germany) is applied to the backlight unit in a thickness of 1 mm and with an ACPC structure with the following parameters: acceptance angle: 80°, shortening factor: 0.05, polymer: polycarbonate, lens structure: compressed semicircle (factor 2), ratio: 0.2, wherein in addition a random structure with a scattering half-power angle of 5° is located on the rear side of the plate. A brightness variation of 3.7% with respect to the mean value is obtained with this structure. A diagram is shown in FIG. 5.

Comparison Example 1

A 32" backlight unit with a lamp mid-point interspacing of 19.8 mm, a lamp diameter of 3 mm and a diffuser plate/lamp interspacing of 6.1 mm is used. A diffuser plate of Makrolon® OD 2015 is applied in a thickness of 2 mm and with a scattering agent content of 5% to the backlight unit. A brightness variation of 7.5% with respect to the mean value is obtained with this structure. A diagram is shown in FIG. 5.

Example 2

A 32" backlight unit with a lamp mid-point interspacing of 96 mm, a lamp diameter of 15 mm and a diffuser plate/lamp interspacing of 18 mm is used. A diffuser plate of Makrolon® OD 2015 is applied in a thickness of 1 mm and with an ACPC structure with the following parameters to the backlight unit: acceptance angle: 80°, shortening factor: 0.05, polymer: polycarbonate, lens structure: compressed semi-circle (factor 4), ratio: 0.2. A brightness variation of 7.7% with respect to the mean value is obtained with this structure. A diagram is shown in FIG. 6.

Comparison Example 2

A 32" backlight unit with a lamp mid-point interspacing of 96 mm, a lamp diameter of 15 mm and a diffuser plate/lamp interspacing of 18 mm is used. A diffuser plate of Makrolon® OD 2015 is applied in a thickness of 2 mm and with a scattering agent content of 5% to the backlight unit. A brightness variation of 35% with respect to the mean value is obtained with this structure. A diagram is shown in FIG. 6.

Figure 6:
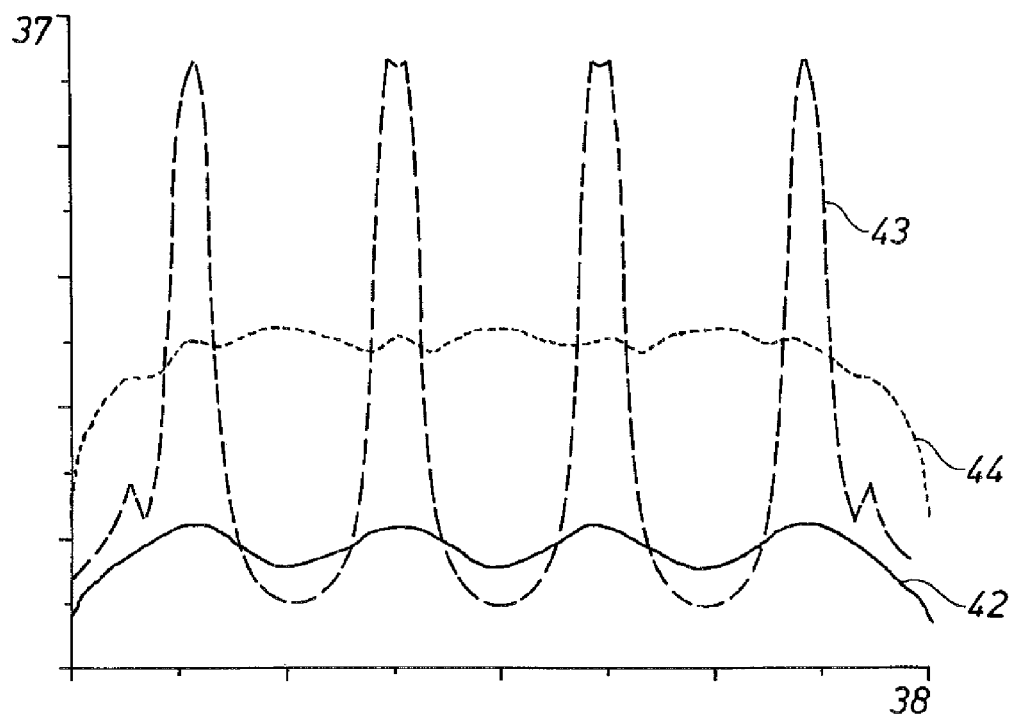
FIG. 6 shows the brightness distribution according to Example 2.

As can be seen from FIG. 5 and FIG. 6, the brightness in the comparison examples varies significantly more sharply than in the diffuser plate with an ACPC structure. In addition the mean brightness is significantly higher.

Example 3

Figure 7:
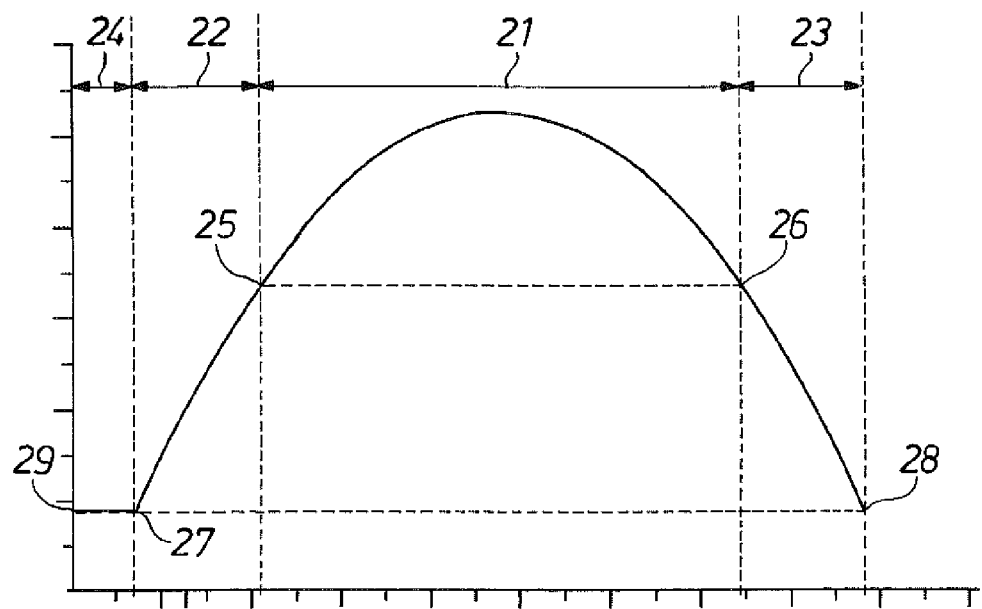
FIG. 7 is a cross-sectional view of the light-guiding structure of Example 3.
Figure 9:
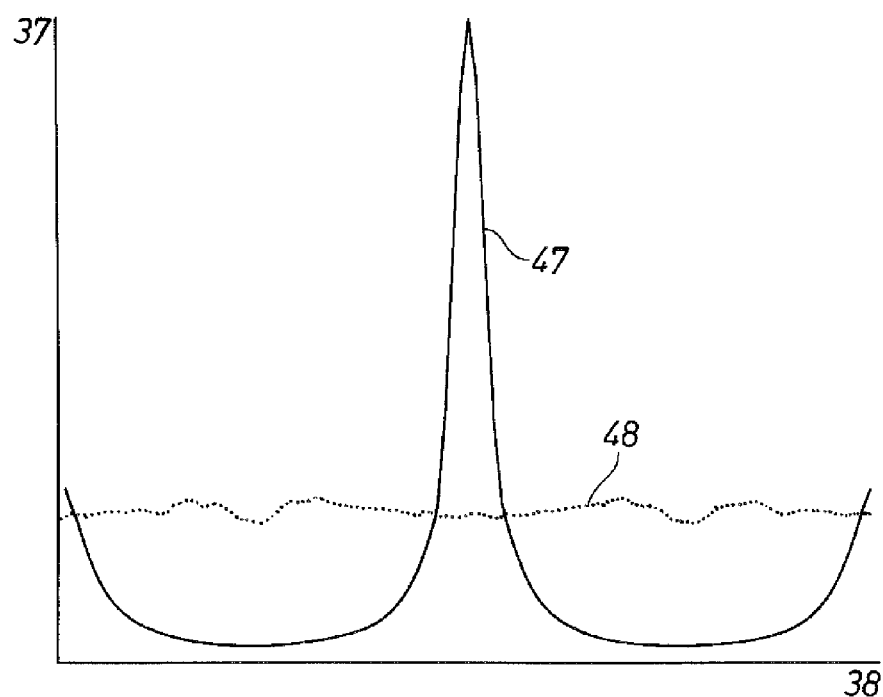
FIG. 9 shows the brightness distribution according to Example 3.

A 32" backlight unit with a lamp mid-point interspacing of 52 mm, a lamp diameter of 3 mm and a diffuser plate/lamp interspacing of 16 mm is used, A diffuser plate of Makrolon® OD 2015 is applied in a thickness of 1.2 mm and with an ACPC structure with the following parameters to the backlight unit: acceptance angle: 40°, shortening factor: 0.1, polymer: polycarbonate, lens structure: linear, ratio: 0.07, polynomial region: second order polynomial (cf. FIG. 7). A brightness variation of 3.7% with respect to the mean value is obtained with this structure. A diagram is shown in FIG. 9.

Example 4

Figure 8:
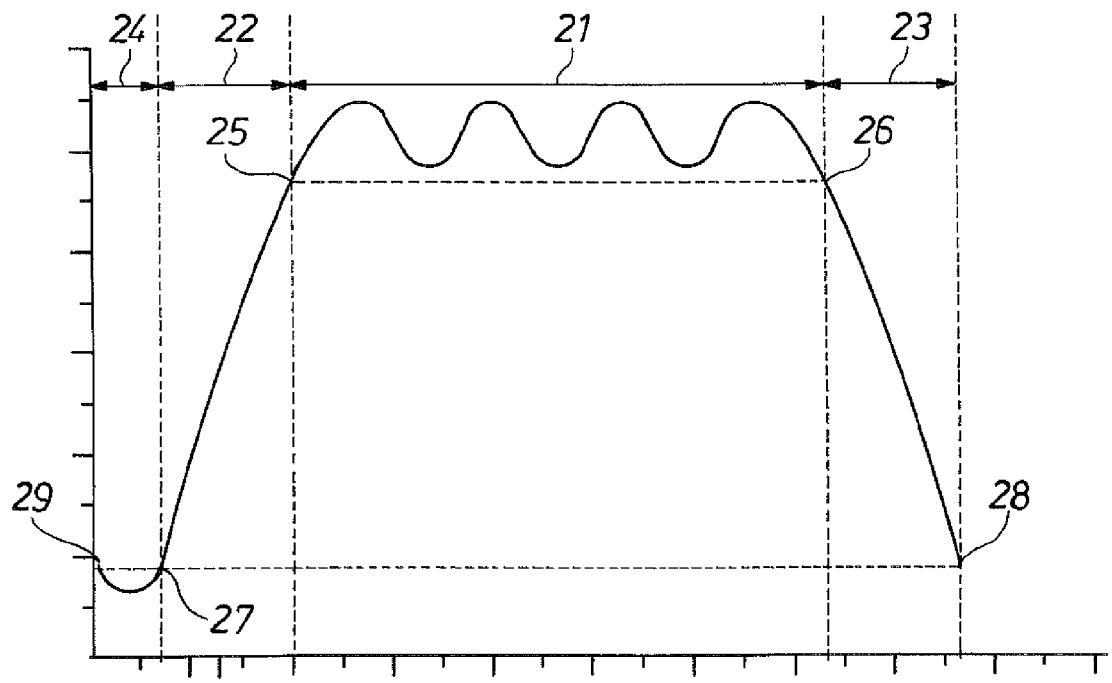
FIG. 8 is a cross-sectional view of the light-guiding structure of Example 4.
Figure 10:
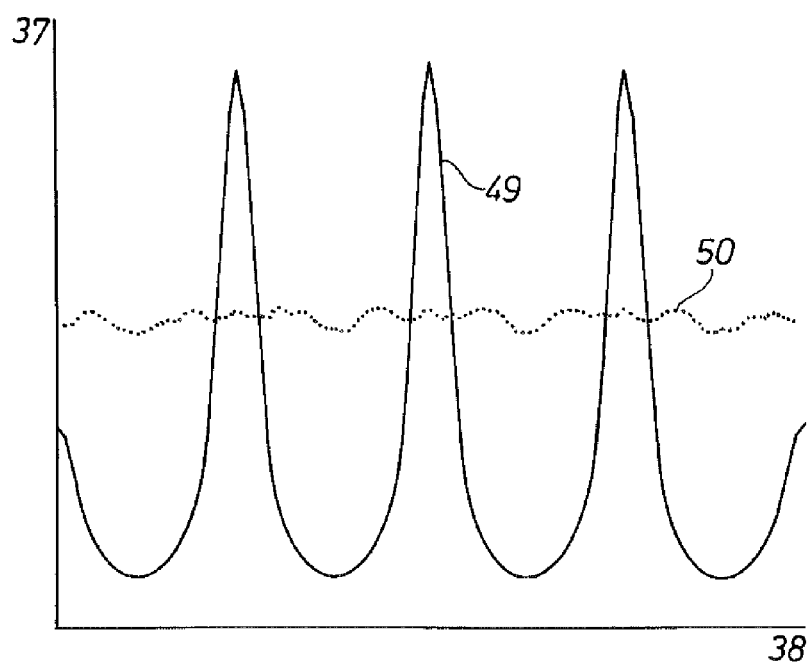
FIG. 10 shows the brightness distribution according to Example 4.

A 32" backlight unit with a lamp mid-point interspacing of 26 mm, a lamp diameter of 3.4 mm and a diffuser plate/lamp interspacing of 3.4 mm is used. A diffuser plate of Makrolon® OD 2015 is applied in a thickness of 1.2 mm and with an ACPC structure with the following parameters to the backlight unit: acceptance angle: 8°, shortening factor: 0.05, polymer: polycarbonate, lens structure: compressed semi-circle (Factor 2), ratio: 0.07, polynomial region: sectionally defined ninth order polynomial (cf. FIG. 8). A brightness variation of 2.2% with respect to the mean value is obtained with this structure. A diagram is shown in FIG. 10.

Examples 3 and 4 show how the brightness variation can be reduced to less than 4% with an ACPC structure that exactly matches the geometry of a backlight unit.

Thus, a moulded article is disclosed. While embodiments of this invention have been shown and described, it will be apparent to those skilled in the art that many more modifications are possible without departing from the inventive concepts herein. The invention, therefore, is not to be restricted except in the spirit of the following claims.

What is claimed is:

1. A planar moulded article comprising a front side and a rear side, characterised in that the front side comprises light-guiding structures formed by a lens region and a CPC region.

2. The planar moulded article according to claim 1, characterised in that the light-guiding structures are substantially translation invariant.

3. The planar moulded article according to claim 2, characterised in that the moulded article in the translation invariant direction comprises overmodulated structures which produce an additional scattering effect.

4. The planar moulded article according to claim 1, characterised in that the lens regions are identical and the CPC regions are identical.

5. The planar moulded article according to claim 1, characterised in that the individual lens regions and CPC regions can be described by independent sets of parameters.

6. The planar moulded article according to claim 1, characterised in that the CPC region is determined by:
  a) calculating the aperture angles in the medium $\theta_1$ and $\theta_2$ from Fresnel's equations by means of the defined acceptance angles;
  b) constructing the parabola branch $P_1$ with the aperture angle in the medium $\theta_1$ and construction of the parabola branch $P_2$ with the aperture angle in the medium $\theta_2$ according to the equation $$y_{1,2} = \frac{(x \mp \cos\theta_{1,2})^2}{2(1 \mp \sin\theta_{1,2})} - \frac{1 \pm \sin\theta_{1,2}}{2}$$

wherein $\theta_{1,2}$ is the aperture angle in the medium of the left ($\theta_1$) and right ($\theta_2$) parabola, x is the X co-ordinate, and $y_{1,2}$ is the Y co-ordinate of the left ($y_1$) and right ($y_2$) parabola;
  c) calculating the end points of the parabola branches $F_1$, $F_2$ and $E_1$, $E_2$;
  d) rotating the parabola branch $P_1$ about the aperture angle in the medium $-\theta_1$ and of the parabola branch $P_2$ about the aperture angle in the medium $\theta_2$ and translation of the parabola branch $P_2$ along the X axis;
  e) in the case of an asymmetric variant where $\theta_1 \neq \theta_2$, determining the inclination of the inclined surface defined by the points $E_1$ and $E_2$;
  f) determining the effective acceptance angles in air from the geometry constructed in steps a) to e);
  g) comparing the effective acceptance angles with the defined acceptance angles, and if the deviation is greater than 0.001%, repetition of steps a) to f) with corrected acceptance angles instead of the defined acceptance angles in step a), wherein the corrected acceptance angles are not equal to the defined acceptance angles, and wherein the corrected acceptance angles are chosen so that the effective acceptance angles from step f) agree with the defined acceptance angles; and
  h) on achieving a deviation of the effective acceptance angles from the defined acceptance angles of 0.001% or less, shortening the parabolas in the y direction to the extent defined by the shortening factor.

7. The planar moulded article according to claim 6, characterised in that the defined acceptance angle $\theta 1$ is between 5° and 60° and that the defined acceptance angle $\theta 2$ is between 5° and 60°.

8. The planar moulded article according to claim 6, characterised in that in step h) the shortening is a simple truncation.

9. The planar moulded article according to claim 6, characterised in that in step h) the shortening is a compression of the geometry along the y-axis by a factor determined by the shortening factor.

10. The planar moulded article according to claim 6, characterised in that $\theta 1 = \theta 2$.

11. The planar moulded article according to claim 1, characterised in that the profile of the lens is an ellipse.

12. The planar moulded article according to claim 1, characterised in that the overall period is in a range between 10 µm and 1 mm.

13. The planar moulded article according to claim 1, characterised in that the structure between the points F1 and F2 of the CPC region is a continuous polynomial function.

14. The planar moulded article according to claim 13, characterised in that the continuous polynomial function is an nth order polynomial.

15. The planar moulded article according to claim 14, characterised in that the structure between the points F1 and F2 of a CPC region is described by a continuous fourth order polynomial, which is continuously differentiable at the Points F1 and F2.

16. The planar moulded article according to claim 1, characterised in that the structure between the Points F1 and F2 of a CPC region is described by a parabola, hyperbola, circular function, sinusoidal function or straight line.

17. The planar moulded article according to claim 1, characterised in that if the profile of the lens region is a lens, the polynomial is an nth order polynomial, and if the profile of the lens region is a circle, the polynomial is an ellipse, and if the profile of the lens region is a compressed circle, the polynomial is an nth order polynomial.

18. The planar moulded article according to claim 1, characterised in that the regions differ by less than 5% from a geometry as described in one of the claims 3 to 10.

19. The planar moulded article according to claim 1, characterised in that the structures cover at least 80% of the surface of the front side.

20. The planar moulded article according to claim 1, characterised in that the moulded article comprises on the rear side a surface structure with a scattering effect.

21. The planar moulded article according to claim 1, characterised in that the moulded article contains on the rear side a UV-absorbing layer.

22. The planar moulded article according to claim 1, characterised in that the moulded article comprises polycarbonate, polystyrene or modified polystyrene.

23. The planar moulded article according to claim 1, characterised in that the rear side comprises a layer which contains scattering particles.

24. The planar moulded article according to claim 23, characterised in that the scattering particles are organic.

25. The planar moulded article according to claim 23, characterised in that the layer covers the whole of the rear side.

26. A method for producing a moulded article having a front side and a rear side, wherein the front side includes light-guiding structures formed by a lens region and a CPC region, the method comprising:
  i) melting material for the moulded article;
  ii) extruding the moulded article; and
  iii) embossing and cooling the moulded article in a roller gap.

27. The method according to claim 26, wherein the extrusion is a co-extrusion of a middle layer and at least one further layer.

28. The method according to claim 26, additionally comprising coating the embossed and cooled moulded article with a lacquer, wherein the lacquer contains scattering particles.

* * * * *